(No Model.)

D. R. & F. M. WOODSUM
ICE CUTTING MACHINE.

No. 509,420. Patented Nov. 28, 1893.

Witnesses:
Wm C. Dashiell
May E. Moore

Daniel R. Woodsum
Frank M. Woodsum
Inventors.

By Wm. K. Moore,
Attorney.

UNITED STATES PATENT OFFICE.

DANIEL R. WOODSUM AND FRANK MELVIN WOODSUM, OF SUNAPEE, NEW HAMPSHIRE.

ICE-CUTTING MACHINE.

SPECIFICATION forming part of Letters Patent No. 509,420, dated November 28, 1893.

Application filed May 6, 1892. Serial No. 432,036. (Model.)

*To all whom it may concern:*

Be it known that we, DANIEL R. WOODSUM and FRANK MELVIN WOODSUM, citizens of the United States, residing at Sunapee, in the county of Sullivan and State of New Hampshire, have invented certain new and useful Improvements in Ice-Cutting Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in ice cutting machines and it has for its objects among others to provide a machine for cutting ice which shall be composed of few parts, which will saw the ice with ease, and which will also be capable of adjustment and also having provisions for moving the machine laterally.

It has for a further object to provide means whereby the cakes cut will all be of a uniform size and further to provide a gage to follow in the path of the saw to keep the kerf open and prevent the cakes from congealing together as they are very apt to do in severe weather before they are removed from the water.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
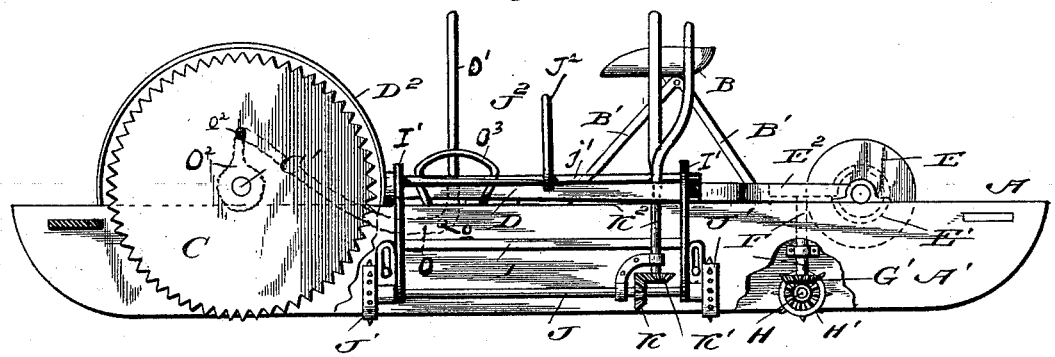
Figure 2:
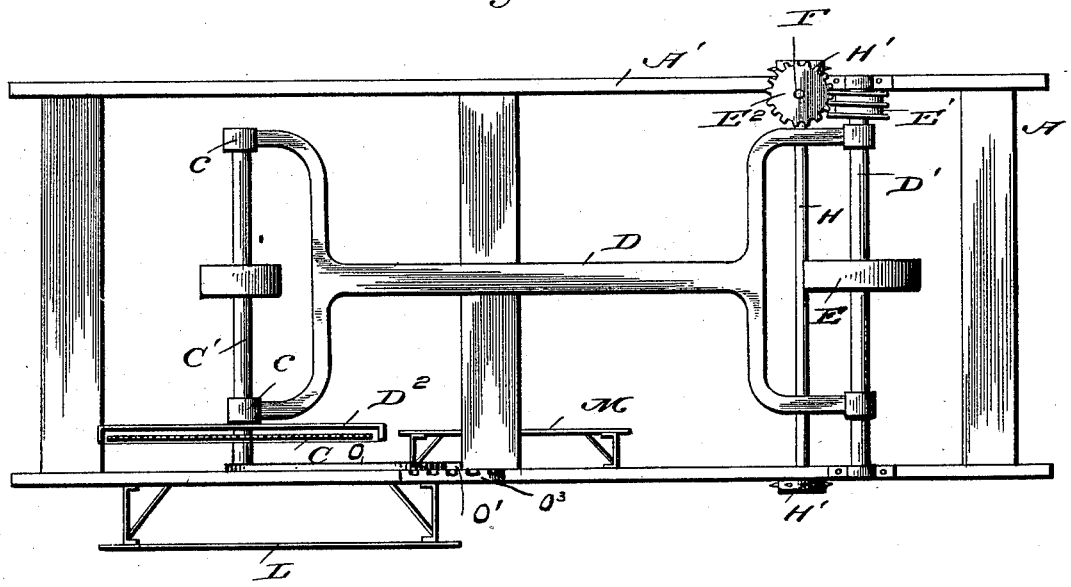

Figure 1 is a side elevation of the improved machine for cutting ice. Fig. 2 is a top plan thereof with parts removed.

Like letters of reference indicate like parts in both views where they occur.

Referring now to the details of the drawings by letter, A designates the frame work which supports the operating parts; it is carried by the runners A' of any well known or preferred form of construction.

B is the seat for the operator; it may be supported in any suitable manner, being shown as supported upon the brace bars B', which are attached to the frame work in any suitable way. This seat is pivoted and arranged substantially over the center of the machine so as to balance the same as nearly as possible.

C is a circular saw carried by the arbor C' which is journaled in the boxes or bearings c which are supported in the forward end of the pivoted frame D, the forward end of this frame being extended laterally and the arms thereof curved as seen in Fig. 2 to provide room for the drive pulley of this shaft as seen in said Fig. 2. This frame D is pivoted at its rear end in any suitable manner, as upon the cross shaft or rod D' supported in the framework and upon which the said frame D may work as on a pivot to permit of its being raised or lowered at its forward end to run the saw deeper or less deep as may be desired. The saw is partially inclosed by a guard $D^2$ which is supported on the forward end of the saw-frame as seen best in Fig. 2, and extending over the same as seen in Fig. 1.

The machine may be propelled by any suitable means; an electric motor, compressed air, belt connection or any way preferred. The power is applied to the shaft D' which is provided with a pulley or it may be a gear wheel E for that purpose, and from this shaft may be extended a belt (not shown) to drive the pulley on the saw arbor and thus revolve the saw; this will be readily understood by anyone skilled in the art and therefore it is not deemed necessary to show the same. On this shaft D' is a worm E' which meshes with a worm wheel $E^2$ on the vertical shaft F which carries a bevel pinion G' meshing with a bevel pinion on the lower shaft H suitably journaled in the frame-work and this shaft carries at each end a spurred wheel H' designed to take into the ice and thus propel the machine ahead.

The pivoted saw-frame is designed to be raised and lowered as occasion may require by suitable pivotal connections as seen in Fig. 1, and consisting of the bell crank lever O pivoted at o to one of the runners and extending to form a handle O' its other end being pivotally connected as at $o^2$ to the link $O^2$ on the saw arbor as shown. The lever is designed to be held in its adjusted position by engagement with a notched quadrant O³ on the runner.

In order to permit of the propulsion of the machine sidewise when desired I have provided the following mechanism:

J is a shaft suitably journaled lengthwise of the machine at one side thereof inside the runner and this shaft carries at each end a spurred wheel J' the said wheels being designed to revolve in a plane at right angles to the length of the machine as will be readily seen in Fig. 2. The shaft carrying these spurred wheels is journaled in such a manner as to be moved vertically when it is desired to run the machine forward and for the purpose of thus raising the said shaft I provide the bar I which connects the uprights I' connected with the bearings of the shaft J and mounted for vertical movement and in the upper ends of the uprights is mounted a cam or crank shaft $j'$. A lever J² is mounted on the shaft $j'$ and extends within convenient reach from the operator's seat as seen in Fig. 1. Turning this lever over at right angles to the length of the machine will throw the wheels up or down as may be required. This shaft is driven as follows:—K is a bevel pinion on the shaft substantially at the center of its length and K' is a bevel pinion carried by the vertical shaft K² and meshing with the said bevel pinion K, the vertical shaft being rotatably mounted in suitable bearings and its upper end formed into a crank handle by which it may be turned by the operator from his seat. It will thus be readily seen how with the saw raised out of contact with the ice the rotation of the vertical shaft K² will give a rotary motion to the spurred wheels J' and thus move the machine transversely to its length, as for instance when it is desired to change the position of the machine to cut in a different place.

L is a gage carried by the runner for the purpose of following the previous cut, so that all cuts made will be the same predetermined distance apart.

M is a plate or gage suitably supported on the frame-work of the machine and designed to travel in the path of the saw to work in the cut made by the saw and clean out the chippings of ice and thus tend to avoid freezing together of the cakes after they are cut.

The advantages of such a machine as has been above described will be apparent, and its operation will be clearly understood.

Modifications in detail may be resorted to without departing from the spirit of the invention or sacrificing any of its advantages.

What is claimed as new is—

1. The combination with the runners and the horizontal shaft journaled in vertically-movable connected bearings and carrying spurred wheels and a bevel pinion, a vertical shaft having a crank handle and carrying a bevel pinion meshing with the said pinion and a cam shaft connected with said bearings and provided with a lever for moving the horizontal shaft vertically, substantially as and for the purpose specified.

2. The combination with the runners and the horizontal shaft journaled in vertically-movable connected bearings and carrying spurred wheels and a bevel pinion, a vertical shaft having a crank handle and carrying a bevel pinion meshing with said pinion and a cam shaft connected with said bearings and provided with a lever for moving the horizontal shaft vertically, a pivoted saw frame, a saw carried thereby on an arbor journaled therein, and means for operating the saw, substantially as specified.

In testimony whereof we affix our signatures in presence of two witnesses.

DANIEL R. WOODSUM.
FRANK MELVIN WOODSUM.

Witnesses:
STANTON DAY,
ALVIN A. YOUNG.